United States Patent
Miyoshi et al.

(12)
(10) Patent No.: US 6,372,860 B1
(45) Date of Patent: Apr. 16, 2002

(54) MOTHER MOLD-FORMING SILICONE RUBBER COMPOSITION AND MOTHER MOLD

(75) Inventors: Kei Miyoshi; Kouichi Tanaka, both of Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/520,885

(22) Filed: Apr. 5, 2000

(30) Foreign Application Priority Data

Apr. 5, 1999 (JP) .......................................... 11-097484

(51) Int. Cl.$^7$ ............................................. C08L 83/10
(52) U.S. Cl. ........................ 525/477; 524/267; 524/731; 524/700; 525/106; 525/478; 525/479; 264/331.15; 264/331.11; 528/32; 528/31
(58) Field of Search ................................. 524/267, 731, 524/700; 525/106, 477, 478, 479; 264/331.15, 331.11; 528/32, 31

(56) References Cited

U.S. PATENT DOCUMENTS 6,169,155 B1 * 1/2001 Alvarez et al.

FOREIGN PATENT DOCUMENTS

| JP | 7118534 | | 5/1995 |
| JP | 1119944 A | * | 1/1999 |

OTHER PUBLICATIONS

Freeman, Silicones, The Plastics Institute, 1962, Tables 2.1 and 2.2.*
Fujiki et al., Chemical Abstracts Service Abstract No. 123: 259130 (1995).
Irifune et al., Chemical Abstracts Service Abstract No. 124: 235012 (1995).
Shin–Etsu Chemical Co., Ltd., Derwent Publications Ltd. Abstract No. 1996–056241 (1996).

* cited by examiner

Primary Examiner—Robert Dawson
Assistant Examiner—Kuo-Liang Peng
(74) Attorney, Agent, or Firm—Birch, Stewart, Kolasch & Birch, LLP

(57) ABSTRACT

In a silicone rubber composition comprising an organopolysiloxane as a base polymer, 0.1–50 parts by weight of a modified silicone fluid having a melting point of up to 100° C. and a refractive index difference of 0.01–0.05 from the base polymer is blended per 100 parts by weight of the composition. The composition is cast and cured to form a mother mold which maintains parting properties over a long term.

5 Claims, No Drawings

MOTHER MOLD-FORMING SILICONE RUBBER COMPOSITION AND MOTHER MOLD

This invention relates to a silicone rubber composition for forming mother molds (master negatives) having improved parting properties and a mother mold.

BACKGROUND OF THE INVENTION

A process of producing a plurality of parts by using a silicone rubber mold as a master negative, casting a resin material in the mold, and curing the material therein has been widely employed in the industry covering from the manufacture of hobby miniature models to the manufacture of industrial trial models.

The silicone rubber used for that purpose has the advantage that a master negative can be formed with ease because it is liquid prior to curing and can be cured simply by mixing with a curing agent and holding at room temperature or heating. Nevertheless, the resin cast and molded in the silicone rubber mold can tightly stick to the mold and is difficult to remove from the mold because the mold is of rubber nature. This problem is commonly solved by using a parting agent (releasing agent). The application of a parting agent is a consideration when it is desired to reduce the process time.

One solution is disclosed in JP-A 7-118534 wherein a crosslinkable base polymer is compounded with a non-crosslinkable silicone polymer having a greater chain length than the base polymer, achieving an improvement in parting properties (releasing properties).

However, this approach still suffers from several problems. Since the silicone fluid added as the parting agent has a greater viscosity than the base polymer, the composition has a higher viscosity than ordinary compositions. Some blending methods can restrain the migration of the non-reactive silicone fluid (parting agent) to the surface. Only a small amount of the parting agent migrates to the surface at the initial of molding.

SUMMARY OF THE INVENTION

An object of the invention is to provide a silicone rubber composition which forms mother molds exhibiting good parting properties from the initial and has a low viscosity. Another object of the invention is to provide a mother mold manufactured therefrom.

It has been found that when an organopolysiloxane base polymer from which a silicone rubber mother mold is to be formed is compounded with a non-crosslinkable oily substance having a refractive index difference of at least 0.01 from the base polymer and a melting point of up to 100° C., the substance migrates to the mold surface, which eliminates a need for parting agent or significantly reduces the number of applications of parting agent. The initial migration of the substance to the mold surface is improved. Since the oily substance need not have a greater molecular weight than the base polymer, the composition can have a low viscosity.

Accordingly the invention provides a silicone rubber composition for forming mother molds comprising an organopolysiloxane as a base polymer wherein up to 50 parts by weight of an oily substance having a melting point of up to 100° C. and a refractive index which differs by at least 0.01 from the refractive index of the base polymer is blended per 100 parts by weight of the composition.

Also provided is a mother mold obtained by casting and curing the composition.

DESCRIPTION OF THE PREFERRED EMBODIMENT

The base polymer of the silicone rubber composition for forming mother molds according to the invention is an organopolysiloxane. Preferably, it is an alkenyl-containing organopolysiloxane and more preferably an organopolysiloxane of the following average compositional formula (1) containing on the average at least two alkenyl radicals in a molecule.

$$R^1_a SiO_{(4-a)/2} \qquad (1)$$

Herein $R^1$ is a substituted or unsubstituted monovalent hydrocarbon radical, 0.01 to 10 mol % of $R^1$ being alkenyl radicals, and "a" is a positive number of 1.9 to 2.4.

Preferably $R^1$ stands for a substituted or unsubstituted monovalent hydrocarbon radical of 1 to 12 carbon atoms, and especially 1 to 8 carbon atoms, attached to a silicon atom. Examples include alkyl radicals such as methyl, ethyl, propyl, isopropyl, butyl, isobutyl, tert-butyl, pentyl, neopentyl, hexyl, heptyl, octyl, nonyl, decyl, and dodecyl, cycloalkyl radicals such as cyclopentyl, cyclohexyl, and cycloheptyl, alkenyl radicals such as vinyl, allyl, propenyl, isopropenyl, butenyl, isobutenyl, hexenyl and cyclohexenyl, aryl radicals such as phenyl, tolyl, xylyl, naphthyl, and biphenyl, aralkyl radicals such as benzyl, phenylethyl, phenylpropyl and methylbenzyl, and substituted ones of the foregoing hydrocarbon radicals in which some or all of the hydrogen atoms are replaced by halogen atoms (e.g., F, Cl and Br) and cyano radicals, such as chloromethyl, 2-bromoethyl, 3,3,3-trifluoropropyl, 3-chloropropyl and cyanoethyl.

In the above organopolysiloxane, preferably methyl accounts for at least 90 mol % (i.e., 90 to 99.99 mol %), preferably at least 95 mol % (i.e., 95 to 99.98 mol %) of the substituted or unsubstituted monovalent hydrocarbon radicals represented by $R^1$. The organopolysiloxane contains on the average at least two alkenyl radicals in a molecule. Specifically, 0.01 to 10 mol %, especially 0.02 to 5 mol % of the entire $R^1$ radicals are alkenyl radicals. If the content of alkenyl radicals is too low, the resulting composition may become less curable. If the content of alkenyl radicals is too high, cured products may have poor physical properties including tensile strength, tear strength and elongation. The alkenyl radical may attach to either a silicon atom at the end of the molecular chain or a silicon atom intermediate of the molecular chain or both. The preferred alkenyl radical is vinyl. The radicals other than the methyl and vinyl radicals are preferably phenyl and 3,3,3-trifluoropropyl radicals.

In formula (1), "a" is a positive number of 1.9 to 2.4, and preferably 1.95 to 2.05. The preferred molecular structure of this organopolysiloxane is a linear diorganopolysiloxane consisting essentially of recurring diorganosiloxane units, especially a linear dimethylpolysiloxane having at least two alkenyl radicals in a molecule Also preferably it has alkenyl radicals at both ends of the molecular chain. It is also acceptable that the organopolysiloxane have a branched structure containing in part $R^1 SiO_{3/2}$ units or $SiO_{4/2}$ units or both in a small portion. Further preferably, the organopolysiloxane is end-blocked with triorganosilyl radicals such as trivinylsilyl, methyldivinylsilyl, dimethylvinylsilyl or trimethylsilyl.

The organopolysiloxane has a wide choice of molecular weight. However, the preferred organopolysiloxane has a viscosity of 500 to 1,000,000 centipoise, and especially 1,000 to 100,000 centipoise at 25° C. because it will cure into a rubbery elastomer and gives a liquid silicone rubber composition.

Illustrative examples of the alkenyl-containing organopolysiloxane are diorganopolysiloxanes shown by the following general formulae.

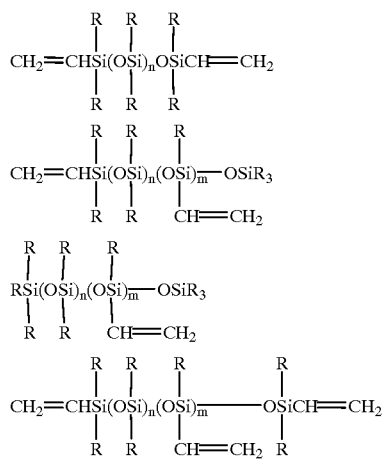

Herein, R is a monovalent hydrocarbon radical excluding alkenyl, and preferably methyl, n is a positive number inclusive of 0, m is such a positive number that the sum of CH=CH$_2$ radicals in the molecule may be two or more, and n or n+m is a number that satisfies the above viscosity range.

An inorganic filler may be blended in the silicone rubber composition of the invention. Typical inorganic fillers are silica fillers in microparticulate form including dry silicas such as fumed silica and wet silicas such as precipitated silica. The filler is used in order to impart a sufficient strength to the cured composition, that is, as a reinforcing filler. Preferably the filler has a specific surface area of at least 10 m$^2$/g, more preferably 50 to 500 m$^2$/g and most preferably 150 to 350 m$^2$/g, as measured by the BET method. Commercially available silicas may be used as the filler. Of the dry silicas, hydrophilic silica is available under the trade name of Aerosil 200 and 300,and hydrophobic silica is available under the trade name of R972, R974 and R976 which are silicas whose surface having methyl, ethyl or vinyl radicals is treated with organosilane or organosilazane compounds having the above radicals (i.e., methyl, ethyl or vinyl radicals) as a substituent, all from Nippon Aerosil K.K. An example of wet silica is Nipsil LP from Nippon Silica K.K. From the reinforcement standpoint, an appropriate amount of the silica filler blended is about 5 to 60 parts, more preferably about 10 to 40 parts by weight per 100 parts by weight of the alkenyl-containing organopolysiloxane. Besides the silica fillers, other fillers may be added for reinforcing or extending purposes. Such other fillers are ground silica or quartz flour such as crystalline silica (e.g., crystallite and Min-U-Sil®), fused silica, spherical silica such as silica prepared by the sol-gel method, metal oxides such as alumina, and carbon black.

It will be appreciated that in mixing the organopolysiloxane with the filler, heat mixing of the components along with a silazane compound, silanol-containing organosilane or siloxane compound added as the additive is advantageous because of improvements in flow and parting properties.

For the purpose of improving the physical properties (e.g., tensile strength and tear strength) of cured products, it is also effective to use in the composition an organopolysiloxane resin of a three-dimensional network structure which consists essentially of R$^1$SiO$_{1/2}$ units and/or SiO$_{4/2}$ units and optionally, at least one of R$^1_3$SiO$_{3/2}$ units and R$^1_2$SiO$_{2/2}$ units wherein R$^1$ is as defined above, contains alkenyl and/or silanol radicals, and is soluble in toluene. An appropriate amount of the organopolysiloxane resin blended is 0 to about 200 parts, more preferably about 5 to 100 parts by weight per 100 parts by weight of the alkenyl-containing organopolysiloxane as the base polymer.

In the composition of the invention, an organohydrogenpolysiloxane is blended as a curing or crosslinking agent for the alkenyl-containing organopolysiloxane (base polymer). This organohydrogenpolysiloxane serves as a crosslinking agent such that hydrosilylation addition reaction takes place between alkenyl radicals attached to silicon atoms in the base polymer and hydrogen atoms attached to silicon atoms (that is, SiH radicals) in the organohydrogenpolysiloxane in the presence of a catalyst, thereby accomplishing crosslinking and curing. The preferred organohydrogenpolysiloxane has at least two, more preferably at least three hydrogen atoms each attached to a silicon atom (that is, SiH radicals) in a molecule and is represented by the following average compositional formula (2):

$$R^2_b H_c SiO_{(4-b-c)/2} \qquad (2)$$

wherein R$^2$ is a substituted or unsubstituted monovalent hydrocarbon radical of 1 to 10 carbon atoms, b is a positive number of 0.7 to 2.1, c is a positive number of 0.001 to 1.0, and the sum of b and c is from 0.8 to 3.0.Further preferably it is liquid at room temperature (25° C.).

Herein, R$^2$ is a substituted or unsubstituted monovalent hydrocarbon radical of 1 to 10 carbon atoms, and especially 1 to 8 carbon atoms. Examples of the radical represented by R$^2$ are the same as exemplified above for R$^1$, preferably those free of aliphatic unsaturation, specifically, alkyl, aryl, aralkyl, and substituted alkyl radicals, with methyl, ethyl, propyl, phenyl and 3,3,3-trifluoropropyl being especially preferred. The letter b is a positive number of 0.7 to 2.1, preferably 1 to 2,c is a positive number of 0.001 to 1.0, preferably 0.01 to 1.0, and b+c is from 0.8 to 3.0, preferably from 1 to 2.4.The molecular structure may be linear, cyclic, branched or three-dimensional network. The SiH radical may attach at the end or intermediate of a molecular chain or both. The molecular weight is not critical although a viscosity of 0.2 to 1,000 centipoise, and especially 1 to 500 centipoise at 25° C. is preferred.

Illustrative examples of the organohydrogenpolysiloxane include 1,1,3,3-tetramethyldisiloxane, methylhydrogen cyclic polysiloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane diphenylsiloxane-dimethylsiloxane copolymers, copolymers of (CH$_3$)$_2$HSiO$_{2/1}$ units and SiO$_{4/2}$ units, copolymers of (CH$_3$)$_2$HSiO$_{1/2}$units, (CH$_3$)$_3$SiO$_{1/2}$ units and SiO$_{4/2}$ units, and copolymers of (CH$_3$)$_2$HSiO$_{1/2}$ units, SiO$_{4/2}$ units and (C$_6$H$_5$)$_3$SiO$_{1/2}$ units.

An appropriate amount of the organohydrogenpolysiloxane blended is about 0.1 to 200 parts, and especially about 0.3 to 50 parts by weight per 100 parts by weight of the alkenyl-containing organopolysiloxane (base polymer). Differently stated, the organohydrogenpolysiloxane is preferably used in such amounts that the ratio of the number of silicon-bonded hydrogen atoms (i.e., SiH radicals) in the organohydrogenpolysiloxane to the number of silicon-bonded alkenyl radicals in the base polymer may range from 0.4:1 to 4:1, and more preferably from 0.8:1 to 3:1.

Also blended in the composition of the invention is an addition reaction catalyst which may be selected from platinum group metals, and compounds and complexes thereof. Examples include platinum black, platinic chloride, chloroplatinic acid, reaction products of chloroplatinic acid with monohydric alcohols, complexes of chloroplatinic acid with olefins, platinum catalysts such as platinum bisacetoacetate, palladium catalysts such as tetrakis(triphenylphosphine)palladium and dichlorobis(triphenylphosphine)palladium, and rhodium catalysts such as chlorotris(triphenylphosphine)rhodium and tetrakis(triphenylphosphine)rhodium. The addition reaction catalyst may be used in a catalytic amount. A desirable amount is 0.1 to 1,000 ppm, and especially 1 to 200 ppm of platinum group metal based on the sum of the alkenyl-containing organopolysiloxane and organohydrogenpolysiloxane. Less than 0.1 ppm of platinum group metal often fails to promote curing of the composition whereas more than 1,000 ppm is uneconomical.

In the composition of the invention, there may be compounded various other components commonly used in conventional compositions of this type. Such other components are, for example, cure retarders or addition reaction inhibitors as typified by acetylene alcohol, and silane and siloxane derivatives of acetylene alcohol and thixotropic agents such as polyethers.

According to the invention, an oily substance is added to the silicone rubber composition comprising the above-described components. The oily substance used herein has a melting point of up to 100° C. and has a refractive index at 25° C. which differs by at least 0.01, preferably at least 0.015, and more preferably at least 0.02 from the refractive index at 25° C. of the base polymer (that is, alkenyl-containing organopolysiloxane).

The oily substance used herein should be semi-compatible with the base polymer rather than fully compatible with the base polymer. The degree of compatibility can be expressed in terms of the difference of refractive index between the oily substance and the base polymer. The oily substance fail to exert its effect if its refractive index difference from the base polymer is less than 0.01. The upper limit of the refractive index difference is preferably 0.05. If the refractive index difference is greater than 0.05, the oily substance is so poorly compatible that the outer appearance may become white turbid, rendering inefficient the operation of cutting out a master model. Namely, if the oily substance used lacks compatibility, a greater than necessity amount of the parting component migrates to the surface of a mold to exacerbate the surface state of resin molded therein, or the composition becomes too thixotropic, inviting the drawbacks of disturbed flow, inefficient deaeration and poor self-leveling during casting to form a rubber mold.

The oily substance should be liquid at a temperature during casting of the composition to form a rubber mold. In this regard, the oily substance should have a melting point of up to 100° C., and preferably up to 70° C. which is the temperature at which compositions of this type are usually cured.

Any desired oily substance may be used as long as it has the refractive index difference and the melting point defined above. For example, hydrocarbon fluids such as paraffinic process oils are used. From the compatibility standpoint, silicone fluids which are liquid at 20° C., and especially modified silicone fluids are preferred.

The modified silicone fluids are typically dimethylsilicone fluids (polydimethylsiloxane) which are modified by replacing some methyl radicals bonded to silicon atoms by various substituents. There are commercially available, for example, amino-modified, epoxy-modified, carboxyl-modified, carbinol-modified, methacrylic-modified, mercapto-modified, phenol-modified, polyether-modified, methylstyryl-modified, alkyl-modified (usually modified with long-chain alkyl of about 6 to 30 carbon atoms, preferably about 12 to 20 carbon atoms), higher fatty acid ester-modified, fluorine-modified, and phenyl-modified dimethylsilicone fluids. Of these, polyether-modified, alkyl-modified, higher fatty acid ester-modified, fluorine-modified and phenyl-modified ones are preferred. Specifically, phenyl-modified dimethylsilicone fluids are suitable since they are inexpensive and commercially used in large amounts.

Where modified silicone fluids are used, those oils which are liquid at room temperature (25° C.) are preferred because of ease of mixing and transparency of the resulting system. The modified silicone fluids should preferably have a viscosity of up to 1,000 centipoise and especially 30 to 500 centipoise at 25° C. although the viscosity is not critical in the practice of the invention.

The oily substance used herein, typically silicone fluid may have a lower viscosity than the base polymer. This eliminates the problem that the prior art composition is increased in viscosity by adding the parting agent thereto, and allows the composition to be adjusted to any desired viscosity.

The oily substance is blended in an amount of up to 50 parts, and preferably 0.1 to 20 parts by weight per 100 parts by weight of the silicone rubber composition (exclusive of the oily substance). An excess of the oily substance may augment the migration of the substance to the surface too much and detract from mechanical properties.

If desired, various well-known components are added to the composition of the invention. The invention may be combined with the technique of adding a silicone fluid having a higher viscosity than the alkenyl-containing polysiloxane as the base polymer as disclosed in JP-A 7-118534.

According to the invention, a mother mold is obtainable by casting the silicone rubber composition in a predetermined mold, followed by curing, in a conventional manner. With respect to the curing conditions of the silicone rubber composition, curing is generally effected at or near the temperature at which a resin material for forming duplicate parts in the mother mold is cured, for the purpose of mitigating the shrinkage of the resin material upon curing. Typically, the silicone rubber composition is cured at a temperature of about 40 to 60° C. for about 2 to 20 hours.

The mother mold thus obtained is effective in molding epoxy resins or urethane resins into articles.

EXAMPLE

Examples of the invention are given below by way of illustration and not by way of limitation.

Example 1

Into a kneader were admitted 800 parts by weight of a dimethylpolysiloxane blocked with a vinyldimethylsilyl radical at each end of its molecular chain and having a viscosity of about 5,000 centipoise at 25° C. and a refractive index of 1.404 at 25° C. as a base polymer and 200 parts by weight of Aerosil R976 having a specific surface area of about 240 m$^2$/g by the BET method (Nippon Aerosil K.K.). After thorough agitation, 80 parts by weight of hexamethyldisilazane and 10 parts by weight of water were added. Cold blending was effected for one hour without application of heat. The mixture was heated to 150° C., mixed for two hours at the temperature, then cooled down to room temperature.

To 500 parts by weight of the thus obtained mixture were added 10 parts by weight of paraffinic process oil PW32 having a refractive index difference (at 25° C.) from the base polymer in the range of 0.02 to 0.05 (Idemitsu Kosan K.K., a dynamic viscosity of 30.85 mm$^2$/sec at 40° C.), 25 parts by weight of methylhydrogenpolysiloxane represented by the average formula shown below, and 100 ppm calculated as platinum atom of chloroplatinic acid-octyl alcohol complex as a catalyst. After thorough agitation, the composition was deaerated in vacuum, cast into a mold, and cured at 60° C. for 2 hours to form a recessed mother mold.

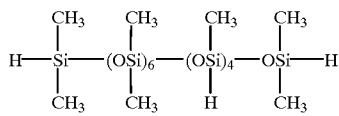

[2]

Example 2

A sample was prepared as in Example 1 except that 2 parts by weight of phenyl-modified polydimethylsiloxane KF50 (phenyl modification 5 mol %, viscosity 100 centistokes at 25° C., refractive index 1.428 at 25° C., by Shin-Etsu Chemical Co., Ltd.) was added instead of the paraffinic process oil. Using this sample, a mother mold was formed as in Example 1.

Example 3

A sample was prepared as in Example 1 except that 2 parts by weight of long-chain alkyl-modified polydimethylsiloxane KF414 (viscosity 100 centistokes at 25° C., refractive index 1.427 at 25° C., by Shin-Etsu Chemical Co., Ltd.) was added instead of the paraffinic process oil. Using this sample, a mother mold was formed as in Example 1.

Example 4

A sample was prepared as in Example 1 except that 0.5 parts by weight of phenyl-modified polydimethylsiloxane KF50 (phenyl modification 5 mol %, viscosity 100 centistokes at 25° C., refractive index 1.428 at 25° C., by Shin-Etsu Chemical Co., Ltd.) and 5 parts by weight of both end trimethylsilyl-blocked polydimethylsiloxane KF96 (viscosity 100,000 centistokes at 25° C., refractive index 1.403 at 25° C., by Shin-Etsu Chemical Co., Ltd.) were added instead of the paraffinic process oil. Using this sample, a mother mold was formed as in Example 1.

Comparative Example 1

A sample was prepared as in Example 1 except that the paraffinic process oil was omitted. Using this sample, a mother mold was formed as in Example 1.

Comparative Example 2

A sample was prepared as in Example 1 except that 5 parts by weight of both end trimethylsilyl-blocked polydimethylsiloxane KF96 (viscosity 100 centistokes at 25° C., refractive index 1.403 at 25° C., by Shin-Etsu Chemical Co., Ltd.) was added Instead of the paraffinic process oil. Using this sample, a mother mold was formed as in Example 1.

Comparative Example 3

A sample was prepared as in Example 1 except that 5 parts by weight of both end trimethylsilyl-blocked polydimethylsiloxane KF96 (viscosity 100,000 centistokes at 25° C., refractive index 1.403 at 25° C., by Shin-Etsu Chemical Co., Ltd.) was added instead of the paraffinic process oil. Using this sample, a mother mold was formed as in Example 1.

Using each of the thus obtained mother molds, a procedure of casting urethane resin Hicast 3017 (H&K Co.) into the recess, curing at 60° C. for one hour, and taking out the urethane article from the mother mold was repeated 30 cycles. At suitable intervals, the force required to remove the urethane article was measured and rated according to the following criterion.

Exc: smooth removal
Good: a light force
Fair: a strong force
Poor: a very strong force or stuck At the same time, the surface of the urethane article which had been in contact with the mother mold was measured for gloss using a gloss meter IG-310 by Horiba K.K.

The results are shown in Table 1.

TABLE 1

|  | Example | | | | Comparative Example | | |
|---|---|---|---|---|---|---|---|
|  | E1 | E2 | E3 | E4 | CE1 | CE2 | CE3 |
| Gloss |  |  |  |  |  |  |  |
| 1st | 97 | 92 | 95 | 97 | 97 | 97 | 95 |
| 5th | 95 | 95 | 89 | 98 | 95 | 95 | 96 |
| 10th | 97 | 89 | 92 | 95 | 92 | 95 | 92 |
| 20th | 95 | 92 | 94 | 99 | 88 | 82 | 94 |
| 25th | 92 | 89 | 92 | 97 | 85 | 79 | 93 |
| 30th | 90 | 92 | 89 | 98 | 72 | 75 | 89 |
| Release | Good | Exc | Exc | Exc | Poor | Poor | Fair |

There has been described a silicone rubber composition comprising an organopolysiloxane base polymer to which an oily substance having a specific refractive index difference is added. The composition is effective for forming a mother mold capable of maintaining parting properties over a long period of time.

Japanese Patent Application No. 11-097484 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A silicone rubber composition for forming mother molds comprising a linear dimethylpolysiloxane having at least two alkenyl radicals in a molecule as a base polymer, and up to 50 parts by weight of a polyether, $C_6$–$C_{30}$ alkyl, higher fatty acid ester, fluorine, or phenyl-modified silicone fluid which is liquid at 20° C. and has a refractive index which differs by at least 0.01 and up to 0.05 from the refractive index of the base polymer per 100 parts by weight of the composition.

2. The composition of claim 1, wherein the base polymer has a viscosity of 1000 to 100,000 centipoise at 25° C.

3. The composition of claim 1, wherein the modified silicone fluid has a refractive index which differs from the refractive index of the base polymer by 0.02 to 0.05.

4. The composition of claim 1, which comprises 0.1 to 20 parts by weight of the modified silicone fluid per 100 parts by weight of the composition.

5. A mother mold comprising a cured product of the silicone rubber composition of any one of claims 1 or 2 to 4.

* * * * *